May 7, 1957 F. C. MENNEN 2,791,350
ATTACHABLE WIRE FORM HANDLE FOR UTENSILS
Filed Nov. 2, 1955 2 Sheets-Sheet 1

Frederick C. Mennen
INVENTOR.

BY *Clarence A. O'Brien*
*and Harvey B. Jacobson*
Attorneys

May 7, 1957  F. C. MENNEN  2,791,350
ATTACHABLE WIRE FORM HANDLE FOR UTENSILS
Filed Nov. 2, 1955  2 Sheets-Sheet 2
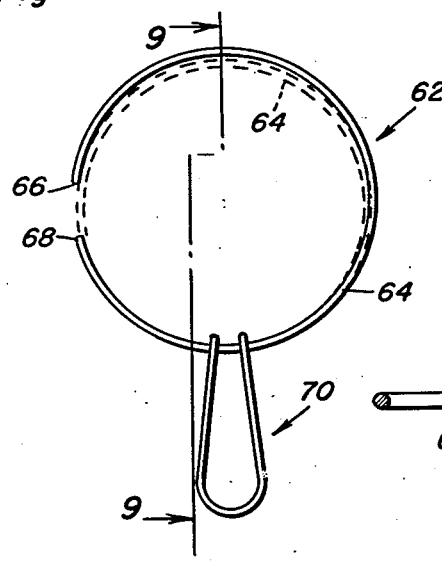
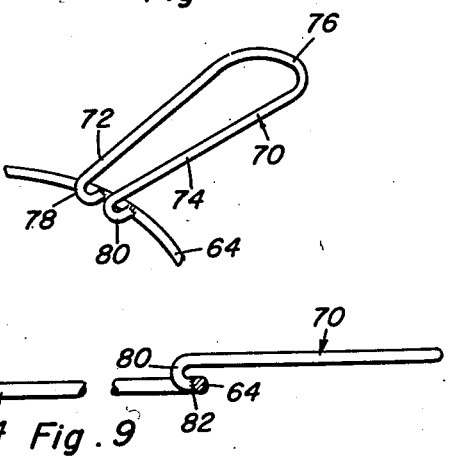
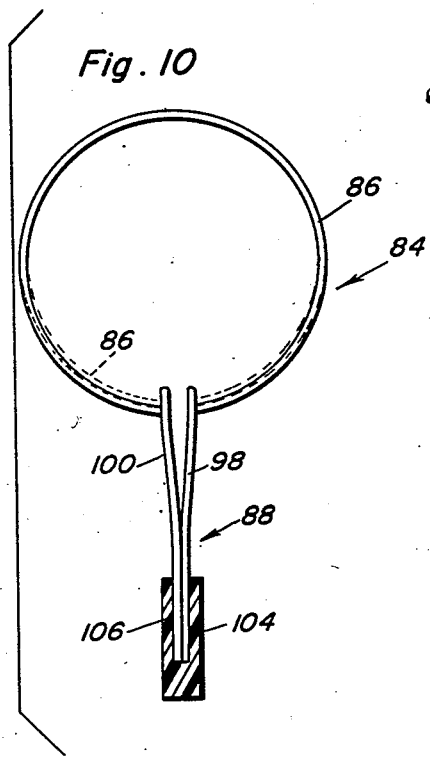
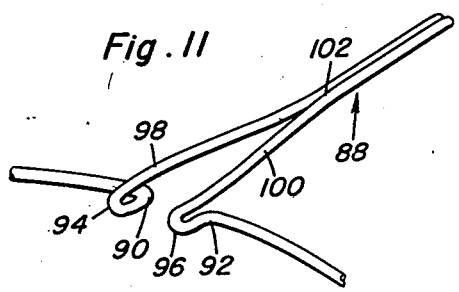
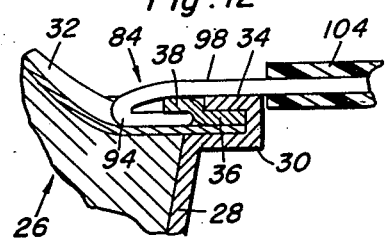
Frederick C. Mennen
INVENTOR.

United States Patent Office 2,791,350
Patented May 7, 1957

2,791,350
ATTACHABLE WIRE FORM HANDLE FOR UTENSILS

Frederick C. Mennen, La Porte, Ind.

Application November 2, 1955, Serial No. 544,493

3 Claims. (Cl. 220—67)

This invention relates in general to new and useful improvements in handles, and more specifically to an improved handle construction specifically intended for use in conjunction with popcorn pans.

At the present time there is on the market at least one type of popcorn pan which holds combined popcorn kernels and fats whereby when the pan is placed over a fire, the popcorn is popped within the pan, the pan being provided with an extensible cover. In order that the popcorn pan may be properly held, it is necessary that that pan be provided with a suitable handle. While there have been devised certain types of handles, the handles have been relatively unstable. It is therefore the primary object of this invention to provide a handle for a pan, such as a popcorn pan which is relatively compact and which may be packaged with the pan without requiring the special construction of such pan.

Another object of this invention is to provide an improved handle for popcorn pans, the handle being formed of wire material whereby the cost of manufacture is relatively low so that the handle is economically feasible in manufacture.

Still another object of this invention is to provide an improved handle for popcorn pans and the like, the handle having a circular portion which is engageable under a lip of the pan, the circular portion being contractible for insertion and removal as desired with respect to the lip of the pan.

A further object of this invention is to provide an improved handle for pans, the handle including a generally circular portion engageable with the pan and a shank portion, the shank portion being offset with respect to the circular portion so as to provide suitable clearance for the pan and at the same time permit the shank portion to extend radially from the pan for proper gripping.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 7 is a plan view of still another modified form of handle and shows the general details thereof;

Figure 8 is an enlarged fragmentary rotated perspective view showing the manner in which the shank portion is connected to the circular portion of the handle of Figure 7;

Figure 9 is an enlarged vertical sectional view taken substantially upon the plane indicated by the section line 9—9 of Figure 7 and shows further the relationship between the shank portion and the circular portion, an intermediate part of the circular portion being broken away;

Figure 10 is plan view of a further modified form of handle and shows the specific details thereof including the details of the connection between the shank portion and a grip member, the grip member being shown in section;

Figure 11 is an enlarged rotated fragmentary perspective view showing the connection between the shank portion and the circular portion; and Figure 12 is an enlarged fragmentary sectional view taken through a popcorn pan, such as the popcorn pan of Figure 1 with the handle of Figure 10 attached thereto.

Figure 1:
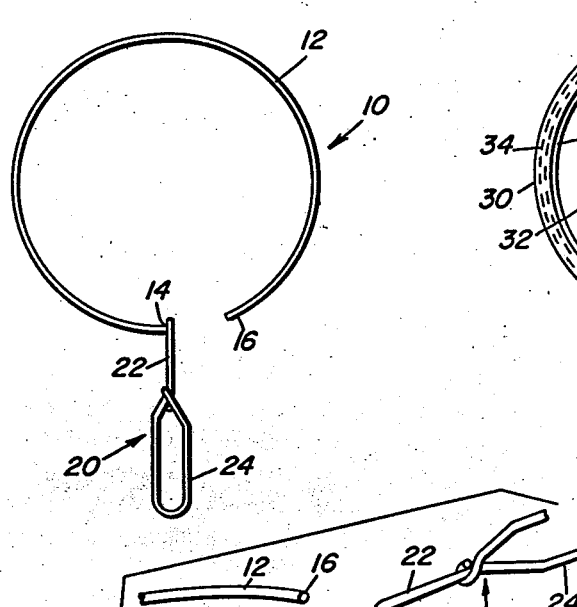
Figure 1 is a plan view of a desirable form of the handle which is the subject of this invention and shows the general outline thereof.
Figure 2:
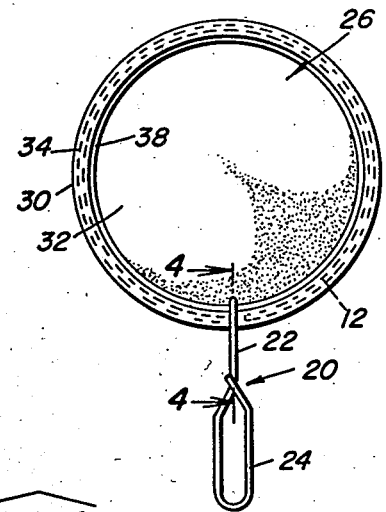
Figure 2 is a plan view showing the handle of Figure 1 attached to a popcorn pan.
Figure 3:
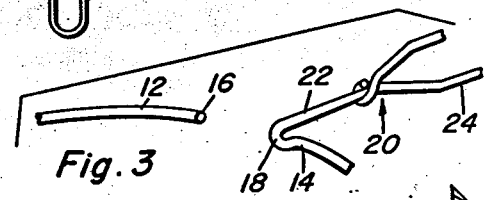
Figure 3 is an enlarged fragmentary perspective view of a portion of the handle, the view being rotated from Figure 1 and shows the specific details of the handle.

Referring now to the drawings in detail, it will be seen that there is illustrated in Figures 1 through 4, inclusive, a preferred form of handle, which is the subject of this invention, the handle being referred to in general by the reference numeral 10. The handle 10 includes a generally circular, pan engaging portion 12 which is formed of wire and includes a pair of end parts 14 and 16. Integrally connected to the end part 14 by means of a reversely bent part 18, as is best illustrated in Figure 3, is a shank portion which is referred to in general by the reference numeral 20. The shank portion 20 includes a shank member 22 which is integral with the reversely bent part 18, as is best illustrated in Figure 3. Formed integral with the shank member 22 and extending from the end thereof remote from the reversely bent part 18 is a grip part 24 which is generally rectangular in outline and is formed by the reversely bending of the wire which forms the shank portion 20.

As described above, the circular portion 12 includes end parts 14 and 16. The end part 16 is free and is spaced from the end part 14. By moving the end parts 14 and 16 towards each other, the general size of the circular portion 12 may be reduced for a purpose apparent hereinafter.

Figure 4:
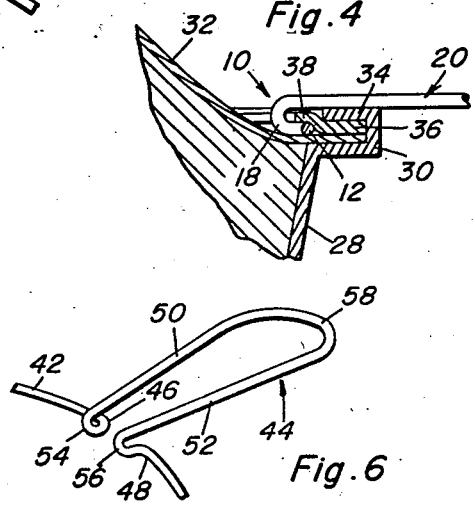
Figure 4 is an enlarged fragmentary vertical sectional view taken substantially upon the plane indicated by the section line 4—4 of Figure 2 and shows the specific connection between the handle of Figure 1 and the popcorn pan.

Referring now to Figures 2 and 4 in particular, it will be seen that there is illustrated a package, which is referred to in general by the reference numeral 26, the package being preferably in the form of a popcorn package. The package 26 includes a pan 28 which is preferably formed of a suitable foil, such as aluminum foil. The pan 28 is provided with a generally C-shaped cross sectional rim 30 which has clamped within the confines thereof an expandable cover 32. Disposed between an upper flange 34 of the rim 30 and an outer portion of the cover 32 is an annular gasket 36 which is preferably formed of paper or other similar material. The gasket 36 extends inwardly of the flange 34 and terminates in a vertically offset lip 38. Disposed beneath the lip 38 is a circular part 12 of the handle 10. It is to be understood that the circular part 12, when contracted, will be of a size to readily fit beneath the lip 38 and when expanded, as is illustrated in Figure 1, will snugly fit under the lip 38 so as to support the pan 28 and its contents. Because of the particular configuration of the reversely bent part 18, the shank 20 will extend over the rim 30 of the pan 28.

Figure 5:
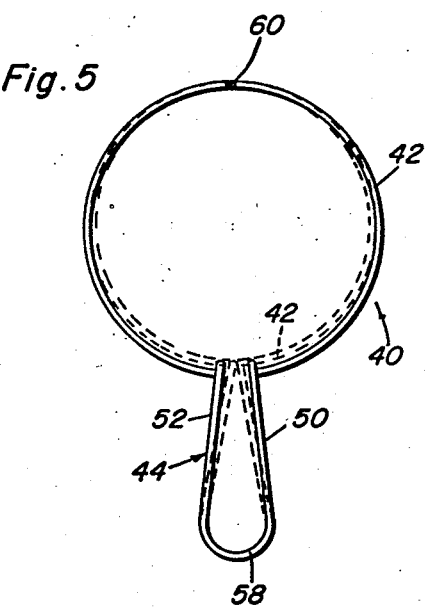
Figure 5 is a plan view of a preferred form of handle, the handle being shown in its contracted position by dotted lines.
Figure 6:
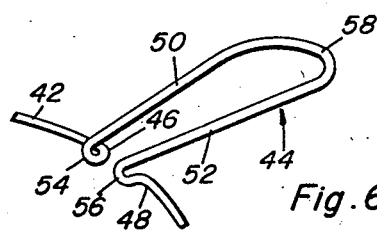
Figure 6 is an enlarged fragmentary, rotated perspective view showing the manner in which the shank portion is connected to the circular portion of the handle.

Referring now to Figures 5 and 6 in particular, it will be seen that there is illustrated a second form of handle which is referred to in general by the reference numeral 40. The handle 40 includes a circular portion 42 and a shank portion which is referred to in general by reference numeral 44. The circular portion 42 includes a pair of spaced end parts 46 and 48, which are best illustrated in Figure 6. The shank portion 44 includes a pair of shank members 50 and 52 which are connected to the end parts 46 and 48 by reversely bent parts 54 and 56, respectively. This particular connection between the shank portion 44 and the circular portion 42 is best illustrated in Figure 6. The ends of the shank members 50 and 52 remote from the reversely bent parts 54 and 56 are connected together by a resilient bight part 58.

Referring once again to Figure 5 in particular, it will be seen that the entire handle 40 is formed of a single piece of wire bent to the configuration illustrated. The wire has the ends thereof suitably welded together as at 60 so that the circular portion 42 will be continuous between the end parts 46 and 48 thereof.

Inasmuch as the end parts 46 and 48 are spaced apart, the circular portion 42 will be resiliently retained beneath a lip, such as the lip 38 of the gasket 36. When it is desired to either place the handle 40 into engagement with a pan, such as the pan 28, or to remove the same therefrom, the circular portion 42 may be contracted by merely squeezing upon the shank portion 44 so as to move the shank members 50 and 52 together. This results in the movement of the end parts 46 and 48 together so that the circular portion 42 assumes the dotted line contracted position of Figure 5. It is to be understood that the relationship of the handle 40 with respect to the pan 28 will be the same as that illustrated in Figure 4 when the two are assembled.

Referring now to Figures 7, 8 and 9 in particular, it will be seen that there is illustrated a third form of handle which is referred to in general by the reference numeral 62. The handle 62, like the handles 10 and 40, include a circular portion 64. The circular portion 64, like the circular portions 12 and 42, is provided with a pair of free end parts 66 and 68, which are in spaced relation. By moving the end parts 66 and 68 together, the effective size of the circular portion 64 may be reduced, as is clearly illustrated by dotted lines in Figure 7.

Connected to an intermediate part of the circular portion 64 is a shank portion which is referred to in general by the reference numeral 70. The shank portion 70 is formed of a separate piece of wire from the circular portion 64 and includes a pair of shank members 72 and 74 which are integrally connected together by a resilient bight portion 76. The shank members 72 and 74 terminate remote from the bight portion 76 in reversely bent parts 78 and 80, respectively. The free ends of the reversely bent parts 78 and 80 are welded as at 82 at spaced points along the circular portion 64.

Although the construction of the handle 62 is somewhat different from that of the handles 10 and 40, the relationship between the circular portion 64 and the shank portion 70 with respect to a pan, such as the pan 28 will remain the same. The circular portion 64 will engage under the lip 38 and the shank portion 70 will overlie the flange 34 of the rim 30.

Referring now to Figures 10, 11 and 12 in particular, it will be seen that there is illustrated a fourth form of handle which is referred to in general by the reference numeral 84. The handle 84 includes a circular portion 86 and a shank portion 88.

The circular portion 86 is formed of a continuous length of wire and terminates in a pair of spaced end parts 90 and 92. Integrally connected to the end parts 90 and 92 are reversely bent parts 94 and 96 which have integrally connected thereto shank members 98 and 100 of the shank portion 88. The shank members 98 and 100 converge as at 102 and extend away from the circular portion 86 in abutting relation. Engaged over the remote ends of the shank members 98 and 100 is a grip member 104. The grip member 104 may be formed of any suitable insulating material including wood, plastic, etc., and is provided with a bore 106 which snugly receives the free ends of the shank members 98 and 100.

Inasmuch as those portions of the shank members 98 and 100 which are connected to the circular portion 86 are disposed in spaced relation, by squeezing the two together, the effective size of the circular portion 86 can be reduced as is shown in dotted lines in Figure 10. Thus the handle 84 may be intermediately engaged with the pan 28 in the same manner as described with respect to the other handles and this particular connection is clearly illustrated in Figure 12. It is to be noted that the shank members 98 and 100 directly overlie the flange 34 and that the grip member 104 is disposed outwardly of the rim 30.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A pan and handle assembly comprising a circular pan, said pan having an inwardly opening channel-shaped edge terminating in an upper inwardly directed free lip, a cover for said pan having a peripheral edge thereof disposed within said channel-shaped rim, an annular gasket overlying said peripheral edge of said cover and extending upwardly and inwardly from said edge to provide an annular space therebeneath, said gasket sealing said cover with respect to said channel-shaped rim, and a handle, said handle having a generally circular portion and a shank portion, said circular portion being engaged under said gasket and overlying said cover, said shank portion being vertically offset from said circular portion and extending over said lip away from said pan.

2. A pan and handle assembly comprising a circular pan, said pan having an inwardly opening channel-shaped edge terminating in an upper inwardly directed free lip, a cover for said pan having a peripheral edge thereof disposed within said channel-shaped rim, an annular gasket overlying said peripheral edge of said cover and extending upwardly and inwardly from said edge to provide an annular space therebeneath, said gasket sealing said cover with respect to said channel-shaped rim, and a handle, said handle having a generally circular portion and a shank portion, said circular portion being engaged under said gasket and overlying said cover, said shank portion being vertically offset from said circular portion and extending over said lip away from said pan, said circular portion and said shank portion being of a continuous one-piece construction.

3. A pan and handle assembly comprising a circular pan, said pan having an inwardly opening channel-shaped edge terminating in an upper inwardly directed free lip, a cover for said pan having a peripheral edge thereof disposed within said channel-shaped rim, an annular gasket overlying said peripheral edge of said cover and extending upwardly and inwardly from said edge to provide an annular space therebeneath, said gasket sealing said cover with respect to said channel-shaped rim, and a handle, said handle having a generally circular portion and a shank portion, said circular portion being engaged under said gasket and overlying said cover, said shank portion being vertically offset from said circular portion and extending over said lip away from said pan, said shank portion including a pair of shank members connected to said circular portion in spaced relation, said shank members being connected together remote from said circular portion by a resilient bight part.

References Cited in the file of this patent
UNITED STATES PATENTS

| | | |
|---|---|---|
| 489,256 | Manning | Jan. 3, 1893 |
| 870,839 | Peterson | Nov. 12, 1907 |
| 1,322,864 | Backlund | Nov. 25, 1919 |
| 2,572,694 | Brennan | Oct. 23, 1951 |
| 2,547,096 | Sawyer | Apr. 3, 1953 |